United States Patent [19]

Uyama et al.

[11] Patent Number: 4,657,682
[45] Date of Patent: Apr. 14, 1987

[54] METHOD FOR DEHYDRATING SLUDGE

[75] Inventors: Kiyoshi Uyama, Kawasaki; Yasuhiko Kihara, Yokohama, both of Japan

[73] Assignee: Nippon Kokan Kabushiki Kaisha, Tokyo, Japan

[21] Appl. No.: 674,543

[22] Filed: Nov. 26, 1984

[30] Foreign Application Priority Data

Jun. 11, 1984 [JP] Japan .................. 59-119521
Jun. 11, 1984 [JP] Japan .................. 59-119522

[51] Int. Cl.⁴ .............................................. C02F 11/12
[52] U.S. Cl. ...................... 210/770; 210/778; 210/783; 34/9; 34/14
[58] Field of Search .............. 210/778, 783, 769, 770, 210/806, 609; 34/9, 12, 14, 17, 19

[56] References Cited

U.S. PATENT DOCUMENTS

| | | | |
|---|---|---|---|
| 741,436 | 10/1903 | Atwood | 34/14 |
| 1,958,279 | 5/1934 | Morgan | 34/95 |
| 2,111,720 | 3/1938 | Padgett | 34/14 |
| 2,119,615 | 7/1938 | Wendeborn | 34/9 |
| 2,279,848 | 4/1942 | Unger | 34/69 |
| 2,452,983 | 11/1948 | Birdseye | 34/9 |
| 3,531,404 | 9/1970 | Goodman et al. | 210/783 X |
| 3,699,881 | 10/1972 | Levin et al. | 34/70 |
| 3,707,774 | 1/1973 | Eise et al. | 34/14 |
| 3,933,634 | 1/1976 | Seki | 210/778 X |
| 4,142,971 | 3/1979 | Le Fur et al. | 210/783 X |
| 4,244,287 | 1/1981 | Maffet | 34/14 |
| 4,245,396 | 1/1981 | Maffet | 34/14 |
| 4,358,381 | 11/1981 | Takeuchi | 210/783 X |
| 4,402,834 | 9/1983 | Bastgen et al. | 210/783 X |
| 4,464,847 | 9/1984 | Dickey et al. | 34/17 |

FOREIGN PATENT DOCUMENTS 3024825 1/1982 Fed. Rep. of Germany .......... 34/14

Primary Examiner—Tom Wyse
Attorney, Agent, or Firm—Frishauf, Holtz, Goodman & Woodward

[57] ABSTRACT

This present invention relates to a method of dehydrating a wet sludge. The wet sludge which is subjected to a preliminary dehydration by gravity dehydration or the like, is pelletized by a pelletizer, and obtained pellets of the sludge are subjected to compression dehydration with a pair of endless filter fabrics.

5 Claims, 24 Drawing Figures

METHOD FOR DEHYDRATING SLUDGE

BACKGROUND OF THE INVENTION

1. Field of the Invention

The present invention relates to a method and apparatus for dehydrating sludge including the step of charging a preliminary dehydrator with a wet sludge and performing preliminary dehydration of the sludge and the step of performing compression dehydration of the predehydrated sludge using an endless filter fabric.

2. Description of the Prior Art

A conventional method is known for dehydrating industrial waste or sludge from a sewage treatment so as to allow easy disposal and facilitate combustion. According to this method, as shown in FIG. 1, a wet sludge 3 is uniformly supplied onto a filter fabric 1 to perform gravity dehydration. Thereafter, the obtained sludge 3 is sandwiched between the filter fabric 1 and another filter fabric 2 to perform compression dehydration. When the sludge 3 is compression-dehydrated by the two filter fabrics 1 and 2, water content 4 in the sludge 3 is removed only in a vertical direction through the filter fabrics 1 and 2 and is not removed in a front-to-rear direction or right-to-left direction. As a result, removal of the filtered water is delayed and the water content in the sludge cannot be decreased beyond a certain degree.

Since the water in the sludge is removed only in the vertical direction through the filter fabrics, when clogging of the filter fabrics 1 and 2 occurs, the water separated from the sludge 3 cannot be easily removed through the filter fabrics 1 and 2.

In addition, when high pressure is applied to the sludge before its water content is decreased to a satisfactory degree, the sludge 3 rolls and leaks from the filter fabrics 1 and 2, thus disabling dehydration.

A conventional dehydration apparatus as shown in FIG. 1 has the following problems:

The first problem is a low dehydration efficiency since only one type of filter fabric is used for both gravity dehydration and compression dehydration of the sludge. In general, a filter fabric having a large filtering area and a large mesh is suitable for gravity dehydration, while a filter fabric having a small mesh is suitable for compression dehydration. In view of this, if only a single type of filter fabric is used for gravity and compression dehydration, the dehydration efficiency is degraded.

The second problem is a low dehydration treatment capacity due to a low gravity dehydration efficiency. As described above, when sludge having a high water content and a high flowability is sandwiched between two filter fabrics and high pressure is applied, the sludge may leak from the filter fabrics. If the gravity dehydration efficiency is low for this reason, the compression dehydration efficiency will be adversely affected. Thus, the overall dehydration treatment capacity is degraded.

The third problem is a low rate of reduction for the water content of the sludge. Since a conventional sludge dehydration apparatus has filter fabrics simply wound around rollers, a maximum compression pressure of only about 2 kg/cm$^2$ can be applied. This pressure does not result in a satisfactory decrease in the water content of the sludge.

SUMMARY OF THE INVENTION

It is an object of the present invention to provide a method and an apparatus which can improve the dehydration efficiency of sludge and significantly decrease the water content of sludge, which can increase a treatment capacity, and which can prevent leakage of sludge from a filter fabric during compression dehydration.

In order to achieve the above objects of the present invention, a step of pelletizing a predehydrated sludge by a pelletizer is included before a step of performing compression dehydration of sludge using an endless filter fabric.

When sludge pellets are subjected to compression dehydration, the filtered water squeezed out of the sludge is exhausted through gaps between the pellets. Therefore, the exhaust speed of the filtered water is increased, and the dehydration efficiency of the sludge is improved.

BRIEF DESCRIPTION OF THE DRAWINGS

FIGS. 4 to 7 show another agitator according to the present invention, in which

DETAILED DESCRIPTION OF THE PREFERRED EMBODIMENTS

A method and an apparatus according to the present invention will be described with reference to each of the following embodiments.

Figure 2:
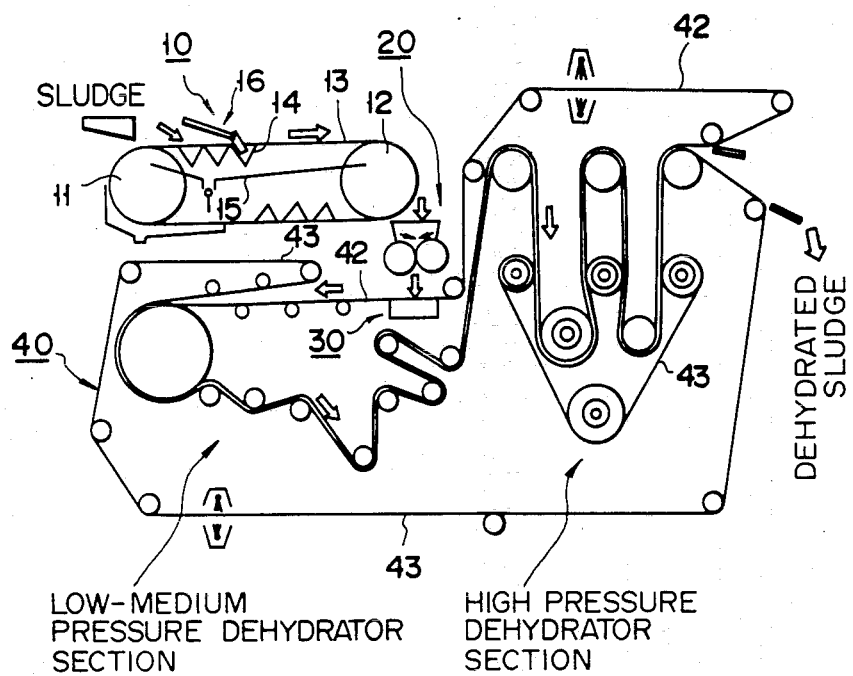
FIG. 2 is a schematic view showing the overall structure of an example of a dehydration apparatus according to the present invention.

FIG. 2 is a schematic view showing the overall structure of an example of a sludge dehydration apparatus according to the present invention. Referring to FIG. 2, reference numeral 10 denotes a preliminary dehydrator; 20, a pelletizer; 30, an excess water separator; and 40, a compression dehydrator. Sludge is dehydrated by the preliminary dehydrator 10 and pelletized by a pelletizer 20. After excess water in the sludge pellets is removed by the excess water content separator 30, compression dehydration of the sludge is performed by the compression dehydrator 40 to complete the dehydration treatment.

Preliminary Dehydration

The preliminary dehydrator 10 shown in FIG. 2 performs gravity dehydration. Chains 13 are looped around pairs of sprockets 11 and 12, and are driven in the direction indicated by arrow X. A plurality of U-or V-shaped bag-like filter fabrics 14 each having an opening between the chains 13 are arranged therebetween. A collector 15 for collecting separated water from the sludge is arranged below the upper array of the filter fabrics 14. Wet sludge is continuously supplied into the filter fabrics 14 driven in the direction indicated by arrow X, and gravity dehydration is performed.

An agitator 16 for agitating the sludge in each filter fabric 14 is preferably included in the preliminary dehydrator. If such an agitator is not included, although sludge portions near the filter fabric are well dehydrated, sludge portions at the center of the sludge mass in each filter fabric are not dehydrated sufficiently. Without an agitator, the sludge portions in each filter fabric remain unmoved, and the overall dehydration efficiency of the sludge cannot be improved. When the agitator 16 is included to agitate the sludge in each filter fabric, the positions of the sludge portions are changed, uniform dehydration of the sludge can be performed, and the dehydration efficiency of the sludge can be improved. In addition, when the agitator operates, the agitating force also acts to compress the sludge and this further improves the dehydration efficiency. As a result, after preliminary dehydration, the water content in the sludge is decreased, high pressure can be applied to a compression dehydrator, and the overall dehydration efficiency can be improved.

Various types of agitators can be used, and some examples are illustrated in FIGS. 3 to 7.

Figure 3A:
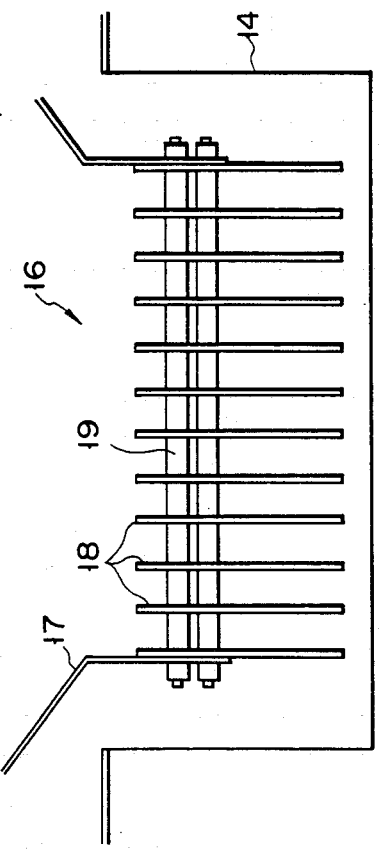
FIG. 3a is a cross-sectional view showing an example of an agitator according to the present invention.
Figure 3B:
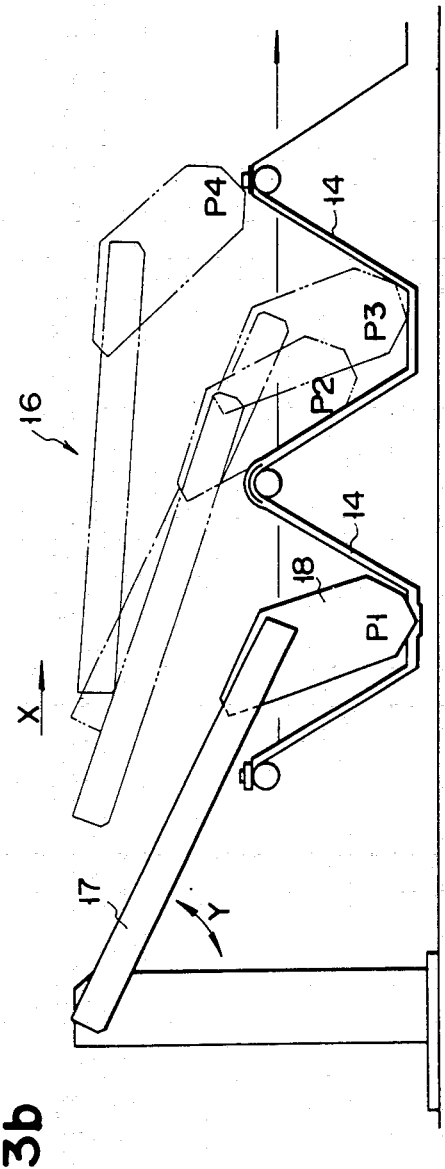
FIG. 3b is a longitudinal sectional view of the agitator according to the present invention.
Figure 4A:
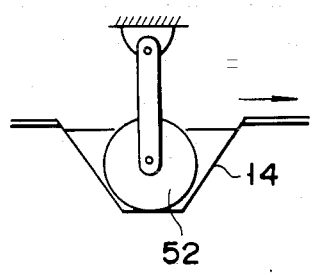
FIGS. 4a, 5a, 6a and 7a are longitudinal sectional views of the agitator.
Figure 4B:
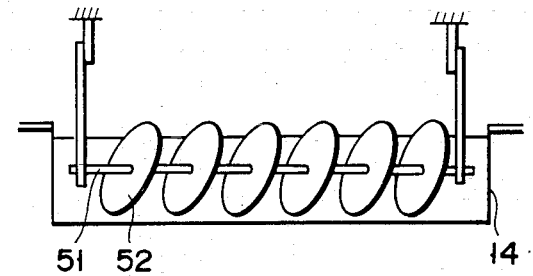
FIGS. 4b 5b, 6b and 7b are cross-sectional views thereof.

In an agitator 16 shown in FIG. 3, arms 17 are arranged along the longitudinal direction (the direction perpendicular to the moving direction of filter fabrics) of a filter fabric 14, and agitating plates 17 are mounted at distal ends of the arms 17. Shafts 19 are mounted to extend through the agitating plates 18 so as to integrally fix the agitating plates 18 in position. Thus, the arms 17 are capable of movement along the direction indicated by arrow X and pivotal movement in the direction indicated by arrow Y about the proximal ends of the arms. Therefore, the agitating plates 18 inserted in each filter fabric 14 serve to form grooves in the sludge contained therein and to agitate the sludge (e.g., Pl, P2, P3 and P4). The agitating plates 18 are moved together with the filter fabric, and a driving source is not required to drive the agitating plates 18.

In this manner, grooves are formed in the sludge portion deposited at the inner periphery of the filter fabric, so that the sludge portions at the center and periphery of the filter fabric are mixed together. Thus, uniform dehydration of the sludge can be performed, and the dehydration efficiency is improved. When the agitating plates 18 are inserted in the sludge, the sludge is compressed, thereby further improving the dehydration efficiency.

FIGS. 4 to 7 show another embodiment of the present invention. In an agitator shown in FIG. 4, a plurality of disks 52 are arranged at predetermined intervals obliquely on a shaft 51 with respect to the shaft 51. The shaft 51 can be rotated or moved vertically. When a filter fabric 14 comes to a predetermined position, the agitator inserts the shaft 51 and the disks 52 into the sludge contained in the filter fabric 14. The disks 52 are rotated to agitate the sludge.

Figure 5A:
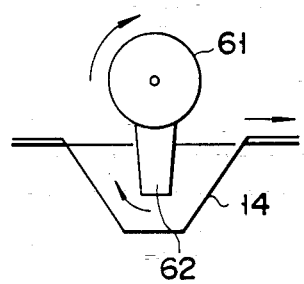
Figure 5B:
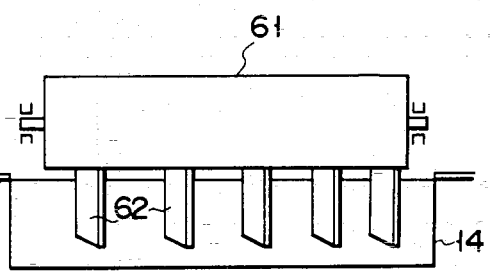

In an agitator shown in FIG. 5, a plurality of agitating plates 62 are linearly arranged on a rotary drum 61. When the agitating plates 62 are directed downward, the agitator is inserted in a filter fabric 14. By synchronizing the travel speed of the filter fabric 14 with the rotational speed of the rotary drum 61, the agitating plates 62 agitate the sludge.

Figure 6A:
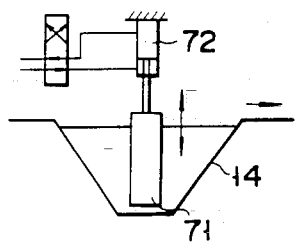
Figure 6B:
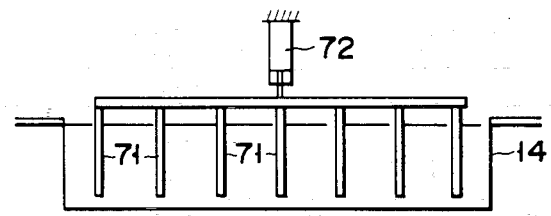

In an agitator shown in FIG. 6, a plurality of agitating plates 71 are arranged linearly along the longitudinal direction of a filter fabric 14. The agitating plates 71 are vertically oscillated by a cam or cylinder 72. The agitating plates 71 agitate the sludge by synchronizing the traveling speed of the filter fabric 14 with the vertical movement of the cylinder 72.

Figure 7A:
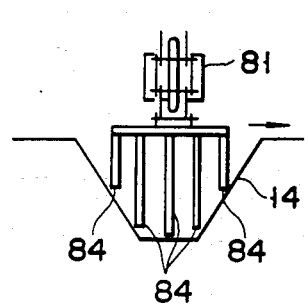
Figure 7B:
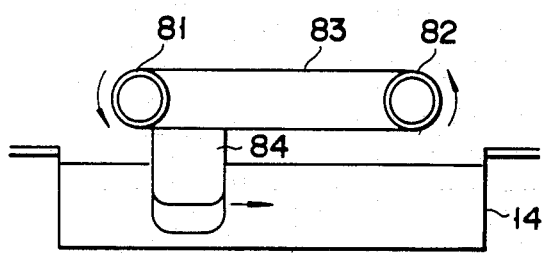

In an agitator shown in FIG. 7, a pair of sprockets 81 and 82 are arranged above a filter fabric 14. A chain 83 is looped around the sprockets 81 and 82. A plurality of agitating plates 84 are arranged linearly along the widthwise direction of the filter fabric 14. The agitating plates 84 agitate the sludge in the filter fabric 14 by synchronizing the movement of the chain 83 with the travelling speed of the filter fabric 14.

The agitators to be used herein are not limited to those described above and can be any agitator which directly or indirectly acts (e.g., vibrates) on the sludge in the filter fabrics to allow uniform dehydration of the sludge.

Figure 8A:
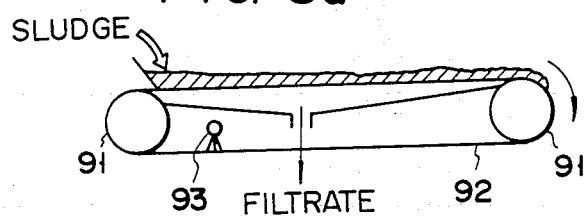
FIGS. 8a and 8b are views for explaining a sludge dehydration apparatus according to the present invention.
Figure 8B:
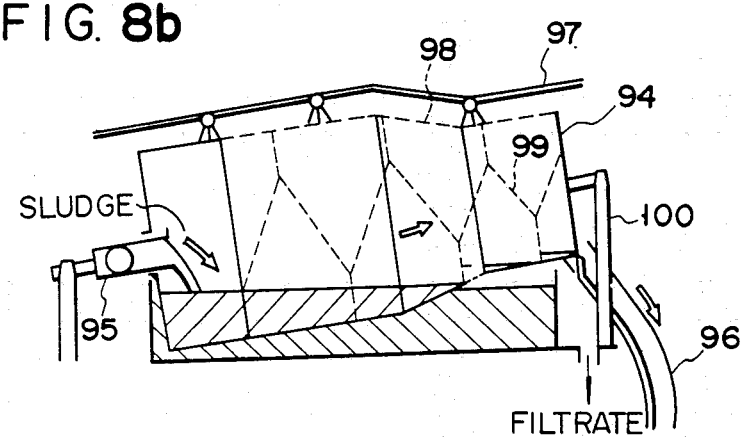

The preliminary dehydrator is not limited to that described above and can be one shown in FIG. 8a or 8b. Referring to FIG. 8a, a flat filter fabric 92 is looped around a pair of rollers 91. Sludge is placed on the filter fabric 92 and is dehydrated, and the filter fabric 92 after the dehydration process is cleaned by a cleaner 93. Referring to FIG. 8b, a drum thickener is used as a preliminary dehydrator. A sludge supply pipe 95 is arranged at one end of a rotary drum 94, a sludge chute 96 is arranged at the other end thereof, and a screen cleaning pipe 97 is arranged thereabove. Part of the circumferential surface of the rotary drum 94 is defined as a screen 98. Feeding spiral blades 99 are arranged inside the rotary drum 94. A shaft 100 drives the rotary drum 94 to dehydrate the sludge while the sludge in the drum 94 is being fed.

Pelletizer

Figure 9A:
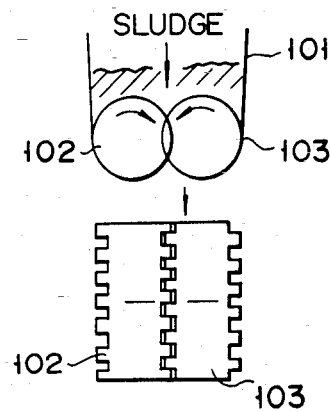
FIGS. 9a, 9b, 9c and 9d are views for explaining various types of pelletizers according to the present invention.

A pelletizer shown in FIG. 9a is a roll-type former and consists of a hopper 101 for holding predehydrated sludge and a pair of rollers 102 and 103 which are arranged below the hopper 101 and which have meshing undulations on their circumferential surfaces. When the rollers 102 and 103 are rotated in the directions indicated by arrows, the sludge in the hopper 101 is pelletized.

Figure 9B:
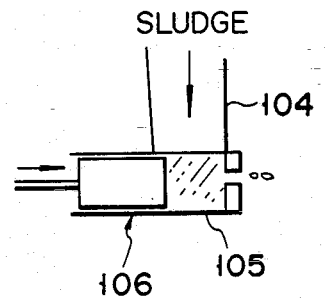
Figure 9C:
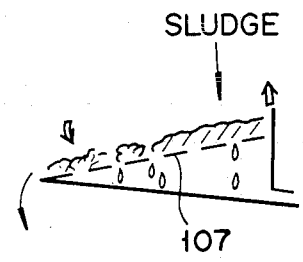
Figure 9D:
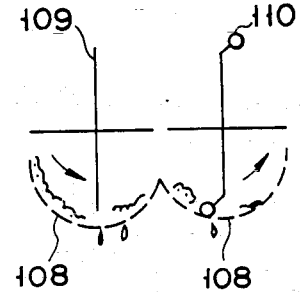

FIGS. 9b to 9d show other types of pelletizers. A pelletizer shown in FIG. 9b is an extrusion type former and consists of a hopper 104 for holding predehydrated sludge, a cylinder 105 and a piston 106 arranged below the hopper 104. The sludge in the hopper 104 is charged in the cylinder 105, and a piston 106 extrudes the sludge and forms it into a minced form. A pelletizer shown in FIG. 9c is a vibration type former and consists of an inclined punching metal plate or net 107 and a vibrator (not shown) for vibrating the net 107. Sludge is placed on the net 107 which is vibrated, thereby pelletizing the sludge. A pelletizer shown in FIG. 9d is a press dehydration former and consists of a semicylinder 108 having a top opening and made of a punching metal, a scraper 109 for reciprocating on the surface of the semicylinder, and a press member such as a press roller 110. The sludge in the semicylinder 108 is pressed by the scraper 109 or the like to form sludge pellets.

According to the present invention, before or after the sludge is pelletized, one or more dehydration assistants, such as coke dust, coal dust or ash, may be added to the sludge. When a dehydration assistant is used, the dehydration efficiency in the subsequent compression dehydration step is significantly improved.

Excess Water Separator

Figure 10A:
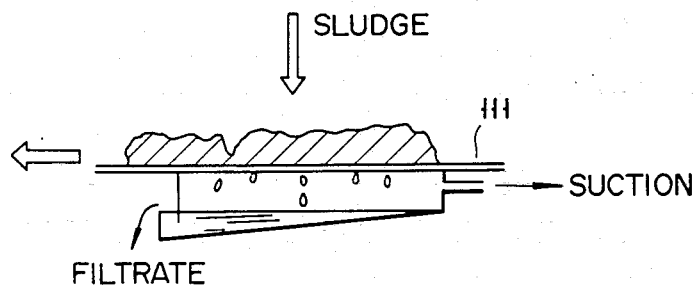
FIGS. 10a and 10b are views for explaining various excess water separators according to the present invention.
Figure 10B:
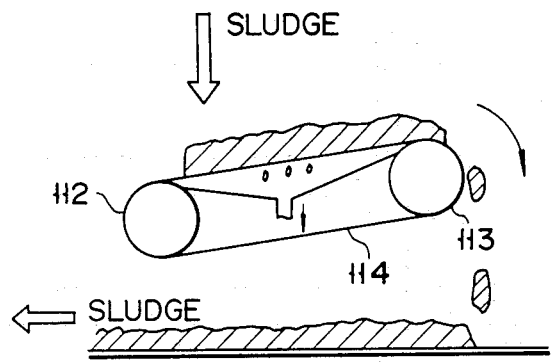

The pellets obtained by the pelletizer are supplied to an excess water separator 30. The excess water separator 30 may be one as shown in FIG. 10a or 10b. An excess water separator 30 shown in FIG. 10a consists of a filter fabric 111 and a vacuum pump (not shown). Sludge is placed on the filter fabric 111, and a vacuum pressure is applied by a vacuum pump from the lower surface of the filter fabric 111. An excess water separator 30 shown in FIG. 10b has a pair of rollers 112 and 113, and a belt-conveyor type filter fabric 114 having a large mesh. Sludge is placed on the filter fabric 114 and is subjected to gravity dehydration.

Compression Dehydrator

Figure 11A:
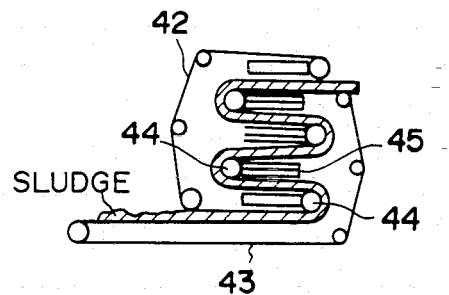
FIGS. 11a and 11b are views showing another compression dehydrator according to the present invention, which is different from that shown in FIG. 2.
Figure 11B:
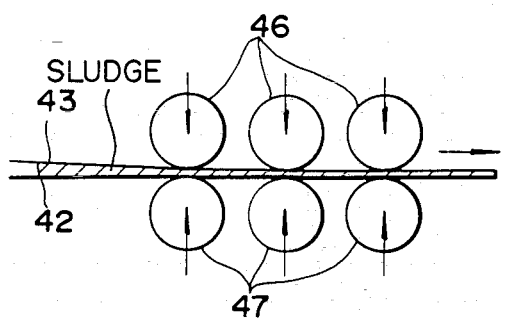

A compression dehydrator shown in FIG. 2 is a belt-press type dehydrator in which sludge pellets are sandwiched between a pair of filter fabrics 42 and 43, and pressure is applied to perform compression dehydration of the sludge. The first half of the dehydrator constitutes a low-medium pressure dehydrator section in which the pressure is gradually increased and dehydration is performed at low to medium pressures, and the second half constitutes a high-pressure dehydrator section in which high-pressure dehydration is performed. In the high-pressure dehydrator section shown in FIG. 2, the filter fabrics 42 and 43 are looped around and changed in direction by a plurality of rollers. The filter fabrics 42 and 43 are thus kept tense to perform high-pressure dehydration. The high-pressure dehydrator section may have a construction as shown in FIG. 11a or 11b. The high-pressure dehydrator section shown in FIG. 11a consists of a plurality of rollers 44 on which filter fabrics 42 and 43 are looped, and a plurality of press plates 45 for applying tension to the filter fabrics 42 and 43. The high-pressure dehydrator section shown in FIG. 11b consists of a plurality of pairs of press rollers 46 and 47, and filter fabrics 42 and 43 sandwiched between the rollers 45 and 47, and sandwiching sludge therebetween.

According to compression dehydration of the present invention, when the water content of sludge is high, the sludge is compressed at a low to medium pressure. As the water content in the sludge is decreased, the sludge is compressed at a higher pressure. Therefore, the water content of the sludge can be reliably decreased, and leakage of the sludge and passage of sludge through the filter fabrics is prevented.

Figure 12:
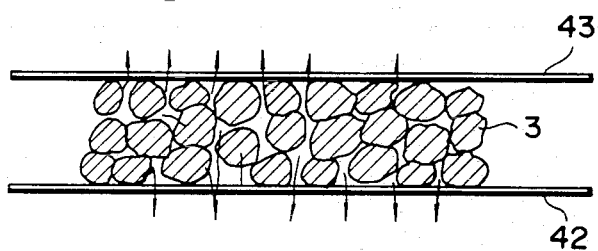
FIG. 12 is a schematic view showing a sludge dehydration mechanism in the compression step according to the present invention.

In the compression dehydration step of the present invention, sludge is formed into pellets. Therefore, the filtered water squeezed in the compression dehydration step is removed externally through gaps between the pellets as indicated by arrows in FIG. 12. Thus, when compared with the conventional dehydration method, the removing speed of the filtered water is faster, and the sludge water content is more quickly decreased. Removing of the filtered water is easy. In addition, since the water content has been decreased to a predetermined value by a pretreatment using a preliminary dehydrator, application of a high pressure does not result in leakage of the sludge from the filter fabrics 42 and 43.

EXAMPLE 1

Sewage sludge was dehydrated using the sludge dehydration apparatus shown in FIG. 2, and decreases in water content were measured in each step. In this case, agitation with an agitator was not performed in the preliminary dehydration step, the pelletizer shown in FIG. 9a was used in the pelletizing step, and the separator shown in FIG. 10a was used in the excess water separation step.

Figure 13:
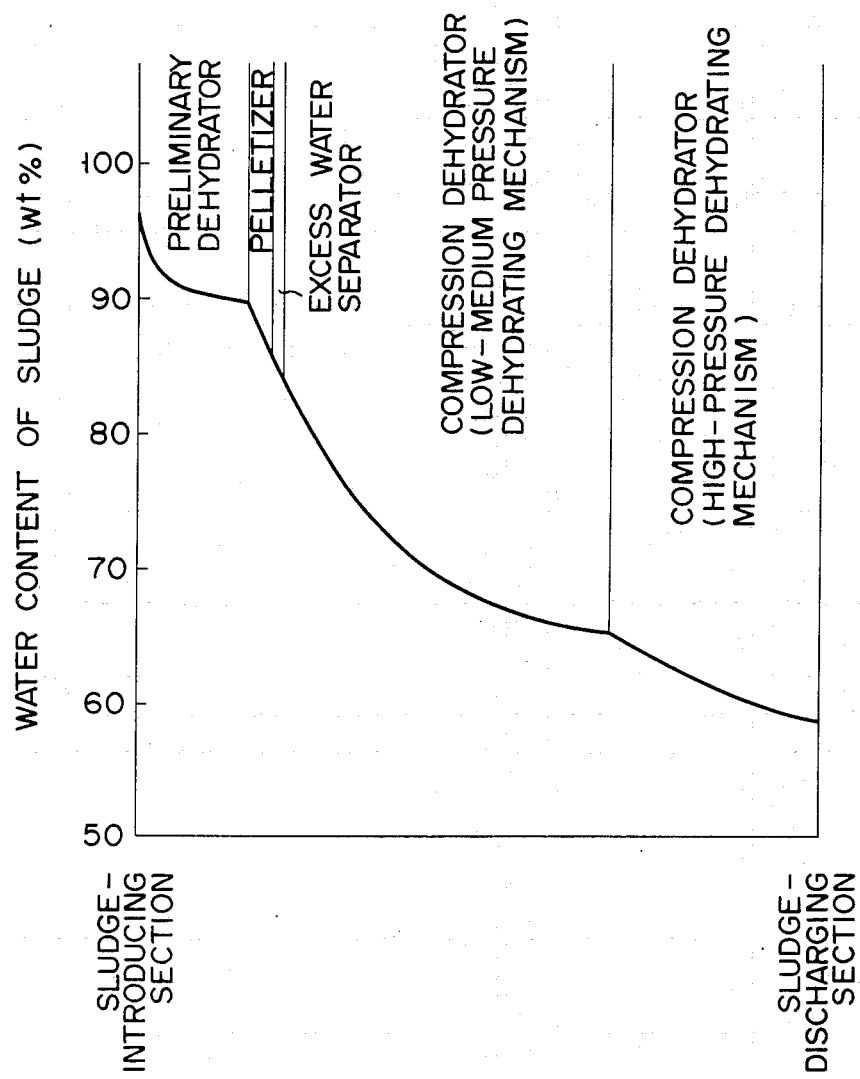
FIG. 13 is graph showing changes in the water content of sludge at various points in the dehydration apparatus in Example 1.

The water content of sludge was decreased to about 90% in the preliminary dehydrator. When the sludge was pelletized by the pelletizer, the water content was decreased further by 3 to 4%. When the pellets were charged in the compression dehydrator after separation of water content by the separator, a water content of about 65% was obtained in the low-medium pressure dehydrator section, and a water content of about 60% was obtained in the high-pressure dehydrator section. The obtained results are shown in FIG. 13.

EXAMPLE 2

Figure 1:
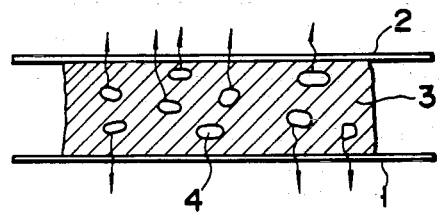
FIG. 1 is a view illustrating dehydration of sludge according to a conventional method.

Sewage sludge was dehydrated by three methods: by the conventional method shown in FIG. 1, by the same method as that in Example 1 except that the pressure in the compression dehydration step was kept constant, and by the same method as that in Example 1 except that pellets of sludge were sprinkled with coke dust and the pressure in the compression dehydration step was kept constant. Other conditions remained the same in each method. In the method of the present invention in which the pellets were not sprinkled with coke dust, the water content in the sludge was about 3% lower than that of the conventional method. The absolute water content in the sludge was also decreased by about 13%. In the method of the present invention wherein the pellets were sprinkled with coke dust, the water content was decreased further, and the absolute water content in the sludge was also decreased. The obtained results are shown in the table below.

TABLE

| | | Prior art | Present invention (without sprinkling with coke dust) | Present invention (sprinkling with coke dust) |
|---|---|---|---|---|
| Water content* | | 68.6% | 65.5% | 58.8% |
| Sludge weight** | | 100 | 91.0 | 96.0 |
| Content in sludge | Absolute water content (% by weight) | 68.6 | 65.5 | 58.8 |
| | Coke dust content (% by weight) | — | — | 8.2 |
| | Solid content (% by weight) | 31.4 | 34.5 | 32.7 |

*Water content = {water content/(water content + solid content)} × 100
**Sludge weight: The weight of sludge obtained by the prior art method was defined as 100.

What is claimed is:

1. A method of dehydrating a wet sludge, comprising the steps of:
   performing a preliminary dehydration by charging a predehydrator with the wet sludge;
   pelletizing the sludge after the preliminary dehydration with a pelletizer;
   removing the excess water content of the pellets of the sludge; and
   performing with an endless filter fabric a compression dehydration of the pellets from which the excess water content is removed.

2. A method according to claim 1, wherein said step of performing the compression dehydration with the endless filter fabric is performed after at least one dehydration assistant selected from the group consisting of coke dust, coal dust, ash and mixture thereof is added to the pellets of the sludge.

3. A method according to claim 1, wherein in said step of performing the compression dehydration using the endless filter fabric, a compression force for dehydration is low during an initial period in which a water content of the sludge is high, and the compression force for dehydration is gradually increased as the water content of the sludge is decreased.

4. A method according to claim 1, wherein said step of removing the excess water content is performed by applying a vacuum force from a lower side of the filter fabric placing the sludge thereon.

5. A method according to claim 1, wherein said step of removing the excess water content is performed by gravity dehydration wherein the sludge is placed on the filter fabric.

* * * * *

UNITED STATES PATENT AND TRADEMARK OFFICE
CERTIFICATE OF CORRECTION

PATENT NO. : 4,657,682

DATED : April 14, 1987

INVENTOR(S) : UYAMA et al

It is certified that error appears in the above-identified patent and that said Letters Patent is hereby corrected as shown below:

Title page, under "References Cited", "Foreign Patent Documents", list:

| DOCUMENT NO. | DATE    | COUNTRY |
|--------------|---------|---------|
| 691,625      | 10/1930 | France  |
| 2,823,409    | 12/1979 | Germany |
| 2,504,406    | 8/1976  | Germany |
| 1,158,359    | 7/1969  | England |
| 2,115,714    | 9/1983  | England |
| 1,447,755    | 9/1976  | England |

Signed and Sealed this

Twenty-sixth Day of January, 1988

*Attest:*

DONALD J. QUIGG

*Attesting Officer*   *Commissioner of Patents and Trademarks*